(No Model.)

S. A. ROUSE.
WINDMILL HINGE.

No. 472,825.  Patented Apr. 12, 1892.

Witnesses  
H. D. Nealy  
E. P. Griffith

Inventor  
Seymour A. Rouse.  
By his Attorney  
C. P. Jacobs.

UNITED STATES PATENT OFFICE.

SEYMOUR A. ROUSE, OF INDIANAPOLIS, INDIANA.

WINDMILL-HINGE.

SPECIFICATION forming part of Letters Patent No. 472,825, dated April 12, 1892.

Application filed April 22, 1891. Serial No. 389,969. (No model.)

*To all whom it may concern:*

Be it known that I, SEYMOUR A. ROUSE, of Indianapolis, county of Marion, and State of Indiana, have invented certain new and useful Improvements in Windmill-Hinges; and I do hereby declare that the following is a full, clear, and exact description thereof, reference being had to the accompanying drawings, in which like letters refer to like parts.

My invention relates to the construction of windmill-hinges wherein the bearing parts are made adjustable and of such shape that any wear and consequent lost motion may be readily taken up and will be understood from the following description.

Figure 1:
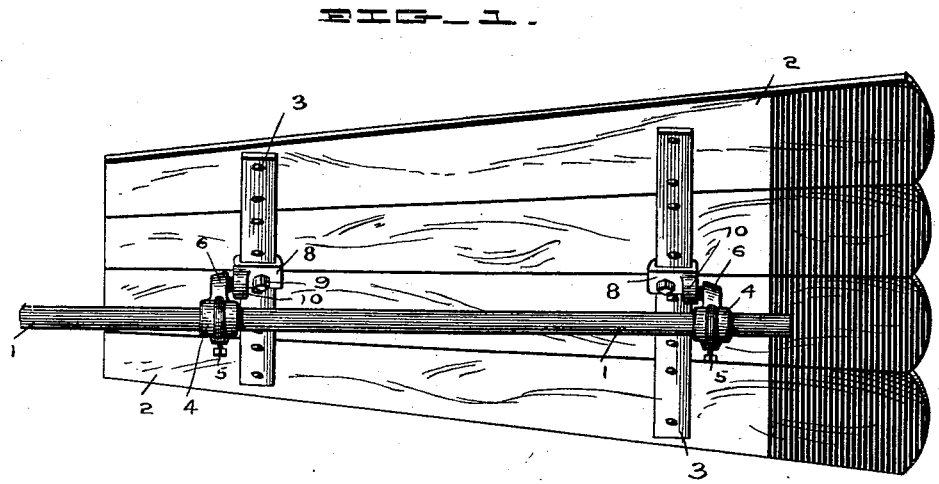
Figure 2:
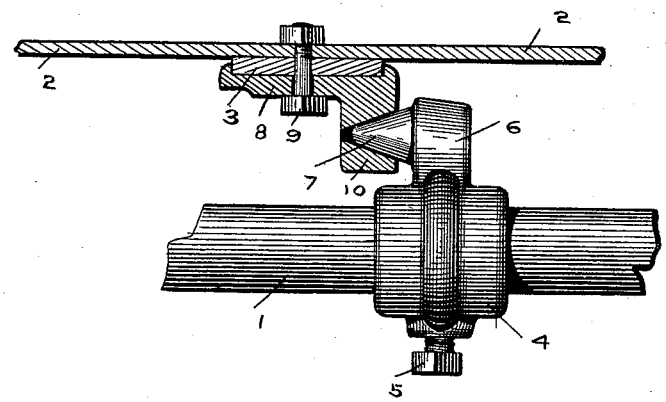

In the drawings, Figure 1 is a perspective view of my device as connecting the sail of a wind-wheel to its rod or spoke. Fig. 2 is an enlarged detail view of the hinge and its connections, partly in section.

In detail, 1 is the rod or spoke.

2 is the sail.

3 is the strengthening-rib, which connects the boards of the sail together.

4 is a collar slipped over the rod 1 and having a projection 6 and a cone-shaped pintle 7, formed integral therewith.

5 is a set-screw for securing the collar 4 to the rod 1.

8 is a clip having a projection 10, in which is formed a conical socket for admitting the conical pintle 7.

9 is a bolt passing through the clip 8, rib 3, and sail 2, having a nut on the outside for locking the parts together. The conical pintle 7, entering a similarly-shaped socket in the projection 10, forms the hinge, and its pintle being connected to the collar 4 it is obvious that by loosening the set-screw 5 the collar may be adjusted on the rod 1 so that the pintle 7 will fit more or less closely, as may be desired, in the conical socket in the projection 10 of the clip. The clip 8 is provided with a flanged recess on its inner face to fit over the sides of the rib 3, securing closeness of fit and preventing displacement of the parts.

As above mentioned, the hinge is herein shown as used for connecting a sail to its rod or spoke; but it is obvious that it may be used for other purposes wherein an adjustable hinge is desired. Of course it will be understood that instead of making the collar 4 adjustable upon the rod the same result would be accomplished by allowing this to remain stationary and making the clip 8 adjustable upon the sail 2, and this would manifestly be the equivalent of the present construction.

I am aware that hinges have been constructed whose pintles are more or less tapering, but I am not aware that any device with a conical pintle entering a similar socket and adjustable so as to take up the wear of the parts and prevent rattling and lost motion has ever been known or used.

What I claim as my invention, and desire to secure by Letters Patent, is the following:

1. An adjustable hinge composed of two parts, one being a slip-collar having a pintle connected therewith, the other a clip provided with a conical socket for receiving the pintle, with means for adjusting the parts relatively one to another, so as to take up any lost motion occasioned by the wear of the pintle or socket, substantially as shown and described.

2. An adjustable hinge composed of two parts, one being a slip-collar having a conical pintle connected therewith, the other a female part having a conical socket to receive the pintle, with means, such as a set-screw, for adjusting the collar along the post or rod, substantially as shown and described.

In witness whereof I have hereunto set my hand this 14th day of April, 1891.

SEYMOUR A. ROUSE.

Witnesses:
E. B. GRIFFITH,
C. P. JACOBS.